(12) United States Patent
Lee et al.

(10) Patent No.: US 9,835,471 B2
(45) Date of Patent: Dec. 5, 2017

(54) SENSOR MODULE AND METHOD FOR OPERATING THE SAME

(71) Applicant: LG INNOTEK CO., LTD., Seoul (KR)

(72) Inventors: Sang Hun Lee, Seoul (KR); Ju Bong Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 9 days.

(21) Appl. No.: 14/759,668

(22) PCT Filed: Jan. 8, 2014

(86) PCT No.: PCT/KR2014/000191
§ 371 (c)(1),
(2) Date: Jul. 8, 2015

(87) PCT Pub. No.: WO2014/109540
PCT Pub. Date: Jul. 17, 2014

(65) Prior Publication Data
US 2015/0354983 A1    Dec. 10, 2015

(30) Foreign Application Priority Data

Jan. 8, 2013 (KR) .................. 10-2013-0002166

(51) Int. Cl.
*G01D 11/24* (2006.01)
*G01D 5/00* (2006.01)
*G01D 5/34* (2006.01)
*G01D 5/04* (2006.01)
*H04L 12/28* (2006.01)
(Continued)

(52) U.S. Cl.
CPC .............. *G01D 5/00* (2013.01); *G01D 11/245* (2013.01); *G01J 1/0204* (2013.01);
(Continued)

(58) Field of Classification Search
CPC .............................. G01D 11/24; G01D 11/245
(Continued)

(56) References Cited

U.S. PATENT DOCUMENTS 5,729,207 A * 3/1998 Yamano ............. G01N 33/0067
340/628
5,918,194 A * 6/1999 Banaska ................ G01D 3/022
340/3.1

(Continued)

FOREIGN PATENT DOCUMENTS

JP    10-019669 A    1/1998
JP    10019669 A *   1/1998
(Continued)

OTHER PUBLICATIONS

International Search Report dated Jun. 2, 2014 issued in Application No. PCT/KR2014/000191.

*Primary Examiner* — Lisa Caputo
*Assistant Examiner* — Jamel Williams
(74) *Attorney, Agent, or Firm* — Ked & Associates, LLP (57) ABSTRACT

Disclosed are a sensor module and a method for operating the same. The sensor module includes a module unit including a first body having a cavity and a module substrate received in the first body; and a sensor unit including a second body detachable from the cavity of the module unit and a sensor received in the second body, wherein the module unit reads an output signal from the sensor unit to generate sensing information and wirelessly outputs the sensing information.

8 Claims, 6 Drawing Sheets

(51) Int. Cl.
*G01J 1/02* (2006.01)
*G01J 1/04* (2006.01)
*G01J 5/02* (2006.01)
*G01J 5/04* (2006.01)
*G01J 5/34* (2006.01)
*G01J 5/08* (2006.01)

(52) U.S. Cl.
CPC ........... *G01J 1/0219* (2013.01); *G01J 1/0271* (2013.01); *G01J 1/0403* (2013.01); *G01J 1/0411* (2013.01); *G01J 5/025* (2013.01); *G01J 5/0205* (2013.01); *G01J 5/0215* (2013.01); *G01J 5/04* (2013.01); *G01J 5/0806* (2013.01); *G01J 5/34* (2013.01); *H04L 12/2827* (2013.01); *H04L 2012/2841* (2013.01)

(58) Field of Classification Search
USPC .......................................................... 73/431
See application file for complete search history.

(56) References Cited

U.S. PATENT DOCUMENTS

| | | | |
|---|---|---|---|
| 8,558,179 B2 | 10/2013 | Filson et al. | |
| 2003/0148636 A1* | 8/2003 | Henry | G01D 11/24 439/10 |
| 2011/0049179 A1* | 3/2011 | Greer, Jr. | B65D 83/30 222/1 |

FOREIGN PATENT DOCUMENTS

| KR | 10-0687209 B1 | | 2/2007 |
|---|---|---|---|
| KR | 10-2009-0097544 A | | 9/2009 |
| KR | 20090097544 A | * | 9/2009 |
| KR | 10-2011-0049179 A | | 5/2011 |
| KR | 20110049179 A | * | 5/2011 |
| KR | 10-1078996 B1 | | 11/2011 |

\* cited by examiner

SENSOR MODULE AND METHOD FOR OPERATING THE SAME

CROSS-REFERENCE TO RELATED PATENT APPLICATIONS

This application is a U.S. National Stage Application under 35 U.S.C. §371 of PCT Application No. PCT/KR2014/000191, filed Jan. 8, 2014, which claims priority to Korean Patent Application No. 10-2013-0002166, filed Jan. 8, 2013, whose entire disclosures are hereby incorporated by reference.

TECHNICAL FIELD

The embodiment relates to a sensor module and a method for operating the same.

BACKGROUND ART

Generally, a home network system includes various sensors.

Figure 1:
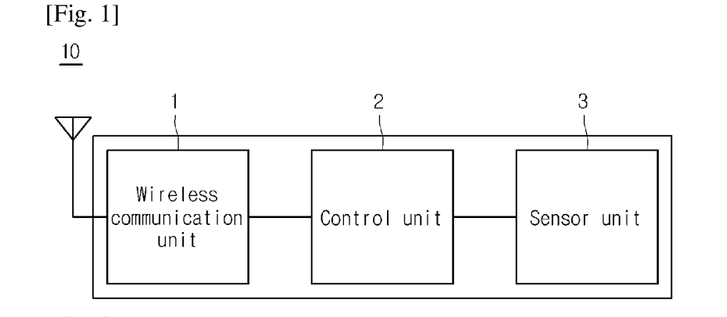
FIG. 1 is a block diagram showing a sensor module according to the related art.

Such a sensor module may cooperate with the home network system through a wireless network and, for example, may have a configuration depicted in FIG. 1.

Referring to FIG. 1, the sensor module 10 according to the related art includes a wireless communication unit 1 connected to an antenna, a control unit 2 and a sensor unit 3.

The control unit 2 receives a sensing signal from the sensor unit 3 and transfers the sensing signal to the wireless communication unit 1. The wireless communication unit 1 processes the sensing signal to transmit the sensing signal to the server through the wireless network.

The sensor modules 10 have structures different from each other according to the functions of sensor units 3.

Figure 2A:
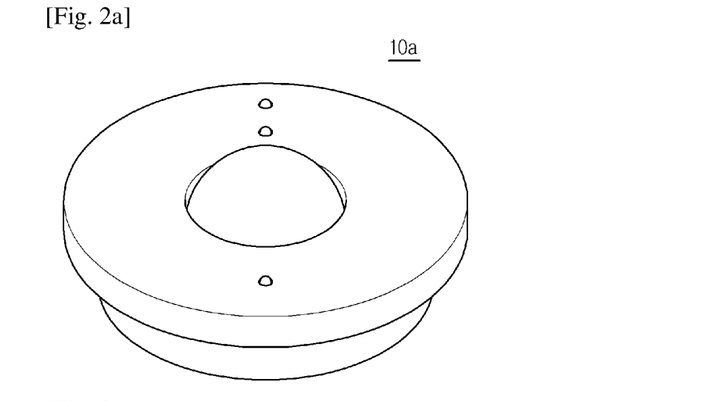
FIGS. 2a to 2c are perspective views showing various shapes of sensor modules according to the related art.

That is, as shown in FIG. 2a, a PIR (Pyroelectric Infrared Ray) sensor or an illumination sensor may have a sensor module 10a having a lens part provided at a front part of the sensor for satisfying an optical property of the sensor.

Figure 2B:
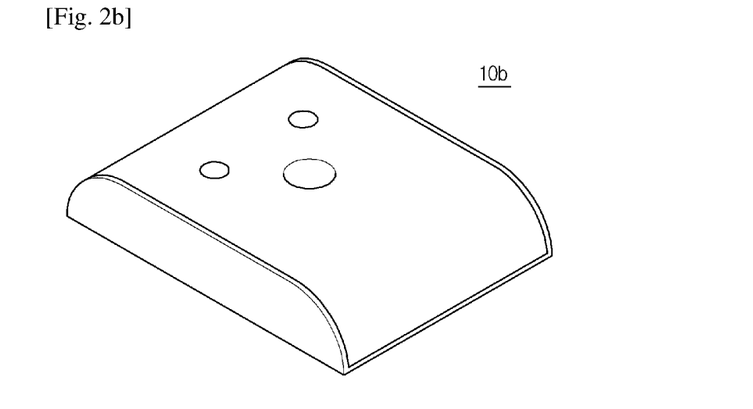

In addition, as shown in FIG. 2b, a temperature sensor or a humidity sensor may have a module structure in which a barrel is formed between an outside and a sensor of a sensor module 10b in order to detect external temperature or humidity.

Figure 2C:
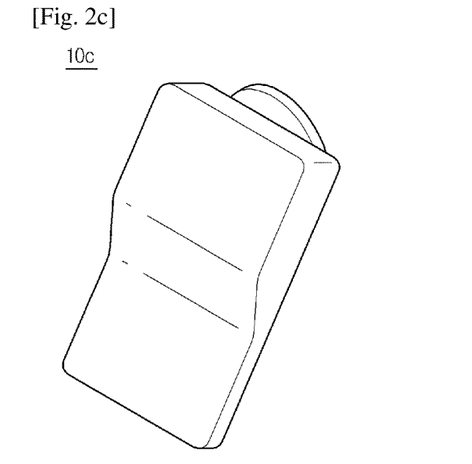

As shown in FIG. 2c, a microwave sensor or an electric field sensor may have a module 10c having no specific structure because the microwave sensor or the electric field sensor detects a variation of a radio wave or electric field in free space.

In the above various sensors, structures of sensor units must be optimized to satisfy an inherent physical property of each sensor, so the mechanical structures of the sensor modules are designed differently from each other.

Thus, a single sensor module performs only a specific function designed when the sensor module is fabricated.

DISCLOSURE

Technical Problem

The embodiment provides a sensor module applicable to various sensor units.

Technical objects of the embodiment may not be limited to the above object and other technical objects of the embodiment will be apparent to those skilled in the art from the following description.

Technical Solution

According to the embodiment, there is provided a sensor module including a module unit including a first body having a cavity and a module substrate received in the first body; and a sensor unit including a second body detachable from the cavity of the module unit and a sensor received in the second body, wherein the module unit reads an output signal from the sensor unit to generate sensing information and wirelessly outputs the sensing information.

In addition, according to the embodiment, there is provided a method of operating a sensor module including coupling a module unit to a sensor unit, wherein the module unit includes a first body having a cavity and a module substrate received in the first body, and the sensor unit includes a second body detachably coupled into the cavity and a sensor received in the second body; transmitting a first signal from the sensor unit to the module unit; determining a kind of the sensor included in the sensor unit based on the first signal by using the module unit; and executing a firmware corresponding to the determined kind of the sensor by using the module unit.

Advantageous Effects

According to the embodiment, a single device is designed to be commonly used for various sensors, so that the development cost and time can be reduced and product standardization is possible.

In addition, according to the embodiment, the kind of a sensor unit currently connected can be automatically determined and the functions of the sensor unit can be performed, so the driving conditions of the sensor unit can be automatically changed according to operating environment, thereby improving the product reliability and user satisfaction.

BEST MODE

Mode for Invention

Hereinafter, the embodiments will be described with reference to accompanying drawings in detail so that those skilled in the art can easily realize the embodiments. However, the embodiments may have various modifications without limitation. For the purpose of convenience of explanation, the details of parts irrelevant to the description of the disclosure will be omitted. The same reference numbers will be assigned the similar elements throughout the drawings.

In the following description, when a predetermined part "includes" a predetermined component, the predetermined part does not exclude other components, but may further include other components if there is a specific opposite description.

The embodiment provides a sensor module applicable to various sensor units by allowing a module unit to be used in common.

Hereinafter a sensor module according to the embodiment will be described with reference to accompanying drawings.

Figure 3:
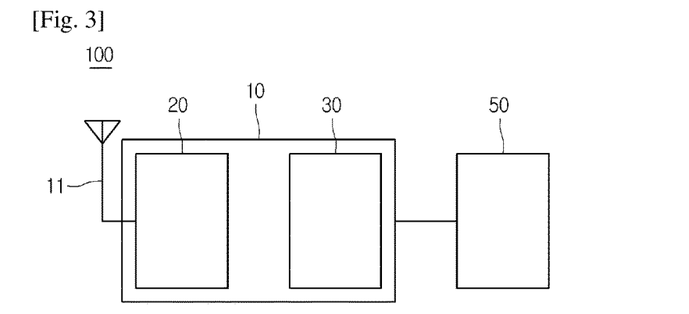
FIG. 3 is a block diagram showing a sensor module 100 according to the embodiment.
Figure 4:
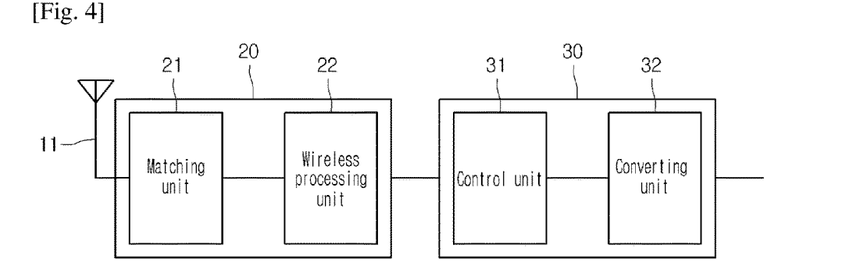
FIG. 4 is a block diagram showing a module unit 10 of FIG. 3 according to the first embodiment.
Figure 5:
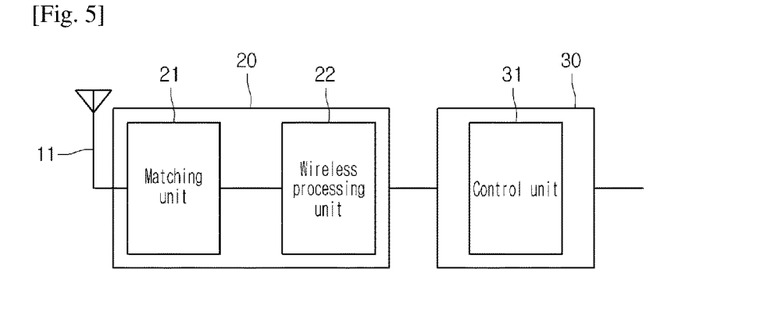
FIG. 5 is a block diagram showing the module unit 10 of FIG. 3 according to the second embodiment.
Figure 6:
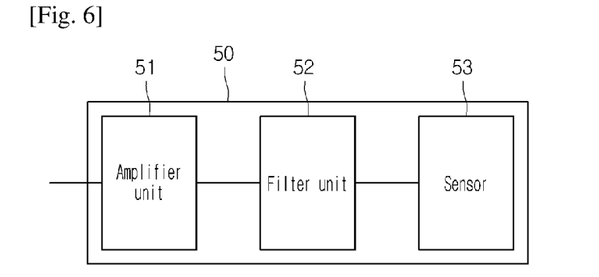
FIG. 6 is a block diagram showing a sensor unit 50 of FIG. 3 according to the first embodiment.
Figure 7:
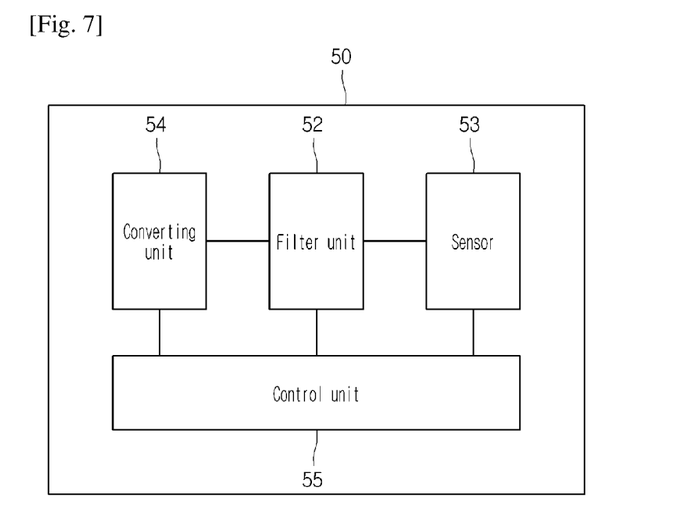
FIG. 7 is a block diagram showing the sensor unit 50 of FIG. 3 according to the second embodiment.
Figure 8:
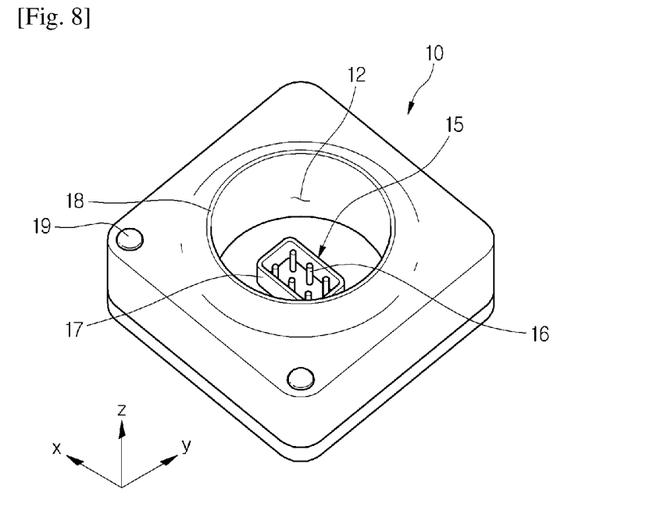
FIG. 8 is a perspective view showing one example of the module unit 10 depicted in FIG. 3.

FIG. 3 is a block diagram showing a sensor module 100 according to the embodiment. FIG. 4 is a block diagram showing the module unit 10 of FIG. 3 according to the first embodiment. FIG. 5 is a block diagram showing the module unit 10 of FIG. 3 according to the second embodiment. FIG. 6 is a block diagram showing the sensor unit 50 of FIG. 3 according to the first embodiment. FIG. 7 is a block diagram showing the sensor unit 50 of FIG. 3 according to the second embodiment. FIG. 8 is a perspective view showing one example of the module unit 10 depicted in FIG. 3.

Hereinafter, a sensor module according to the embodiment will be described in detail with reference to FIGS. 3 to 8.

As shown in FIG. 3, the sensor module 100 according to the embodiment includes a module unit 10 and a sensor unit 50.

The first and second embodiments are distinguished from each other according to a kind of signal transmitted from the sensor unit 50 to the module unit 10.

That is, in the first embodiment, an analog sensing signal is generated from the sensor unit 50 and transmitted to the module unit 10. The module unit 10 converts the analog sensing signal into a digital signal and generates sensing information based on the digital signal.

In the second embodiment, the analog sensing signal is generated from the sensor unit 50 and the sensor unit 50 converts the analog sensing signal into a digital signal. Then, the sensor unit 50 transmits the digital signal to the module unit 10. The module unit 10 generates sensing information by using the digital signal.

The module unit 10 according to the embodiment includes a wireless communication unit 20 and a control unit 30.

In this case, the wireless communication unit 20 of the first embodiment includes a matching unit 21 and a wireless processing unit 22, and the control unit 30 includes a control unit 31 and a converting unit 32.

In addition, the wireless communication unit 20 of the second embodiment includes a matching unit 21 and a wireless processing unit 22, and the control unit 30 includes only a control unit 31.

That is, in the first embodiment, the converting unit 32 is additional included for converting an analog signal transmitted through the sensor unit 50 into a digital signal. But in the second embodiment, the converting unit is omitted because the digital signal is transmitted from the sensor unit 50.

Thus, the following description will be focused on the module unit 10 according to the first embodiment. Since the module unit 10 according to the second embodiment is substantially equal to that of the first embodiment except for the operation of the converting unit 32, the detailed description thereof will be omitted.

The module unit 10 includes the wireless communication unit 20 and the control unit 30 therein, and is connected to the sensor unit 50 through a connector 15. The connector 15 includes a connector pin 16 and a connector guide 17.

The wireless communication unit 20 includes an impedance matching unit 21 and a wireless processing unit 22.

The impedance matching unit 21 is connected to the antenna 11 to receive a signal from the antenna 11. The impedance matching unit 21 performs an impedance matching and then, transfers a filtered signal to the wireless processing unit 22.

Various wireless types of wireless chips may be mounted on the wireless processing unit 22 according to a wireless network in the surroundings. For example, a wireless scheme such as ZigBee, Bluetooth, Z-Wave, or Wi-Fi may be applied according to the coverage.

Since the wireless communication unit 20 communicates with a server through a wireless network, the wireless communication unit 20 receives a control signal transmitted through the server and transmits sensing information generated based on the sensing signal of the sensor unit 50 to the server.

The wireless processing unit 22 modulates or codes the sensing information transferred from the control unit 30. In addition, the wireless processing unit 22 decodes or demodulates a control signal received from the impedance matching unit 21 and transfers the decoded or demodulated control signal to the control unit 30.

The control unit 30 receives an output signal (sensing signal) output from the sensor unit 50 and reads the output signal to generate the sensing information which is transmitted to the server.

The control unit 30 may selectively include the converting unit (A-D converting unit) 32 according to the kind of signal transmitted from the sensor unit 50.

The control unit 31, which is an element of the control unit 30, is a main control unit for substantially controlling an overall operation of the module unit 10. Thus, the control unit 31 will be called a main control unit below.

The main control unit 31 of the first embodiment compares a digital signal applied from the converting unit 32 with a reference value. When the digital value is equal to or greater than the reference value, the main control unit 31 determines that an object is sensed and generates sensing information about the determination result.

Further, the main control unit 31 of the second embodiment compares a digital signal transmitted through the sensor unit 51 with a reference signal. When the digital value is equal to or greater than the reference value, the main control unit 31 determines that an object is sensed and generates sensing information about the determination result.

Meanwhile, the main control unit 31 stores a plurality of firmware corresponding to kinds of the sensor unit 50.

For example, the main control unit 31 stores a firmware for driving a temperature sensor, a firmware for driving a humidity sensor, a PIR (Pyroelectric Infrared Ray) sensor, a firmware for driving an illumination sensor, a firmware for driving a microwave sensor and a firmware for driving an electric field sensor.

When the sensor unit 50 is connected to the connector 15, the main control unit 31 determines a firmware to be practically driven among the plurality of firmware according to a kind of the connected sensor unit 50 and drives the determined firmware to generate sensing information according to the sensing signal transferred from the sensor unit 50.

In this case, if the sensor 53 constituting the sensor unit 50 is a temperature sensor and the firmware driven in the module unit 10 is not the firmware corresponding to the temperature sensor but firmware for any other sensor (for example, humidity sensor or electric field sensor), the main control unit 31 cannot generate normal sensing information.

Thus, when the sensor unit 50 is connected to the connector 15, the main control unit 31 of the embodiment identifies the kind of sensor 53 constituting the sensor unit 50 and drives the firmware corresponding to the identified kind of sensor 53.

In this case, the main control unit 31 determines the kind of the sensor by applying a scheme according to a kind of signal transferred from the sensor unit 50.

That is, the main control unit 31 of the first embodiment analyzes the signal transferred through the sensor unit 50 to determine the kind of sensor.

The analyzed signal is the analog signal transferred from the sensor unit 50.

In general, waveforms of analog signals output from each sensor have characteristics different from each other according to kinds of sensors.

For example, the analog waveform of the electric field sensor is continuously maintained at a constant value and then abruptly changed in a specific section. In addition, the value of the analog waveform of the illumination sensor continuously varies.

Thus, in the embodiment, the characteristics of analog signals of each sensor are understood beforehand and the understood characteristics are tabled to be stored in the main control unit 31. The table is utilized later to identify the kind of connected sensor unit 50.

Meanwhile, there may be a case that the characteristics of analog signals of mutually different sensors are similar to each other.

Thus, according to the embodiment, a test time period is set at the initial time point of connecting the sensor unit 50 to the connector 15 to detect the kind of connected sensor unit 50.

During the test time period, the condition of surrounding environment of the sensor module 100 may be continuously changed in order to detect the kind of sensor.

For example, if the sensor unit 50 is connected, the temperature condition of surrounding environment is continuously changed above all. If the variation of the analog waveform transferred from the sensor unit 50 corresponds to the changed temperature condition, the main control unit 31 determines that the sensor unit 50 is a temperature sensor. To the contrary, if the variation of the analog waveform does not correspond to the changed temperature condition, the main control unit 31 replaces the temperature condition of surrounding environment with another condition (for example, variation in humidity or illumination).

Thus, the main control unit 31 determines whether the waveform of the analog signal is varied corresponding to the variation of the surrounding environment, such that the main control unit 31 detects the kind of sensor 53 constituting the control unit 50.

Meanwhile, the main control unit 31 according to the second embodiment identifies the kind of sensor 53 constituting the sensor unit 50 by using information transferred from the sensor unit 50.

The sensor unit 50 according to the second embodiment has the function of transmitting a digital signal. Thus, the sensor unit 50 includes a control unit 55.

Therefore, when the sensor unit 50 is connected to the connector 15, the control unit 55 of the sensor unit 50 transmits information about the kind of sensor 53 through a specific pin among the connector pins 16 included in the connector 15.

In addition, the main control unit 31 determines the kind of sensor constituting the sensor unit 50 by using the information transmitted through the sensor unit 50 and drives the firmware corresponding to the kind of sensor according to the determination result.

The sensor unit 50 is physically spaced apart from the module unit 10 and connected to the module unit 10 through the connector 15. That is, the sensor unit 50 may be selectively coupled to or separated from the connector 15 of the module unit 10.

As shown in FIG. 6, the sensor unit 50 according to the first embodiment includes a sensor 53, a filter unit 52 and an amplifier unit 51.

In addition, as shown in FIG. 7, the sensor unit 50 according to the second embodiment includes a sensor 53, a filter unit 52, a converting unit 54 and an amplifier unit 55.

Hereinafter the sensor unit 50 according to the first embodiment will be described.

The sensor 53 may include various sensors, such as a temperature sensor, a humidity sensor, a PIR (Pyroelectric Infrared Ray) sensor, an illumination sensor, a microwave sensor or an electric field sensor, which may be used to wirelessly control a lighting and HVAC (Heating, Ventilation, Air Conditioning) system.

Such a sensor 53 transfers a sensing signal to the filter unit 52. The filter unit 52 filters noise from the signal transferred through the sensor 53 and outputs the filtered signal.

The amplifier unit 51 amplifies the output signal from the filter unit 52 and outputs the amplified analog signal.

The sensor unit 50 configured above may include various sensors therein. The kinds of sensors are selectively detected and the sensor units 50 have the same external structure.

Thus, although the sensor unit 50 may be classified as a temperature sensor, a humidity sensor, a PIR (Pyroelectric Infrared Ray) sensor, an illumination sensor, a microwave sensor or an electric field sensor according to the kind of sensors, the sensor unit may be fabricated to have the same external structure such that the sensors may be incorporated with one common module unit 10.

That is, in the sensor module 100, the sensor unit 50 having various sensors 53 may be coupled to the common module unit 10 through the connector 15.

The sensor unit 50 according to the first embodiment transmits the sensing signal, which is an analog signal, to the module unit 10.

The sensor unit 50 according to the second embodiment may further include a converting unit 54 and a control unit 55.

The converting unit 54 converts the analog signal filtered by the filter unit 52 into a digital signal and transfers the digital signal to the module unit 10.

The control unit 55 controls the overall operation of the sensor unit 50.

That is, the control unit 55 allows the converting unit 54 to perform an analog-to-digital conversion of the signal and allows the converted signal to be transmitted to the module unit 10.

In addition, when the sensor unit 50 is connected to the connector 15 of the module unit 10 at the early stage, the control unit 55 transmits the sensor information previously stored therein to module unit 10.

In this case, the sensor information includes information about sensors 53 constituting the sensor unit 50, that is, kinds of sensors 53 (a temperature sensor, a humidity sensor, a PIR (Pyroelectric Infrared Ray) sensor, an illumination sensor, a microwave sensor or an electric field sensor).

Figure 9:
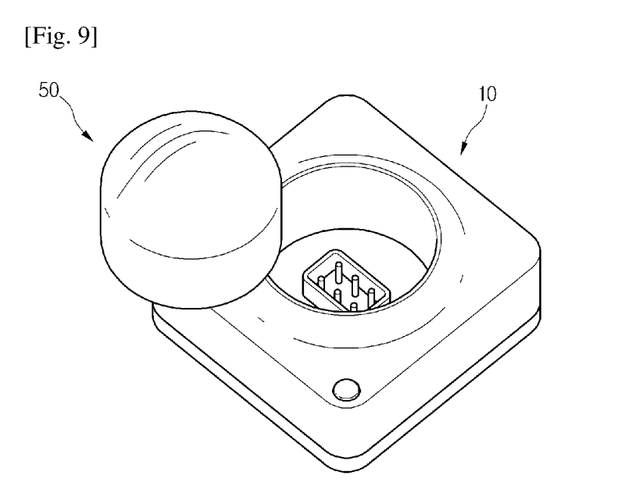
FIG. 9 is a perspective view showing a combination of the module unit 10 and the sensor unit 50.

FIG. 8 is a perspective view showing one example of the module unit 10 depicted in FIG. 3. FIG. 9 is a perspective view showing a combination of the module unit 10 and the sensor unit 50.

Referring to FIGS. 8 and 9, the sensor module 100 according to the embodiment is divided into the module unit 10 and the sensor unit 50.

As shown in FIG. 8, the module unit 10 includes a body 18 having the cavity 12 provided on a top surface thereof.

The body 18 has a space therein. A module substrate including a wireless communication unit 20 and a control unit 30 is received in the space of the body 18.

As shown in FIG. 8, the body 18 may have a regular hexahedron shape, but the embodiment is not limited thereto and the body 18 may have a cylindrical or elliptical shape.

The body 18 may have a rear surface of a flat shape to be attachable.

As shown in FIG. 8, the cavity 12 in the top surface of the body may have a section having a circular or rectangular shape.

The body 18 may be formed of insulating resin or ceramic.

An indicator 19 for signifying upper and lower sides may be further include on the top surface of the body 18, but the embodiment is not limited thereto.

The cavity 12 has a predetermined depth and includes the connector 15 protruding from the bottom surface of the cavity 12.

The connector 15 includes a connector guide 17 and connector pins 16 formed in the guide 17.

The connector 15 may be provided in the central region of the bottom surface of the cavity 12, but the embodiment is not limited thereto.

The connector 15 guides the sensor unit 50 inserted into the cavity 12 to allow the sensor unit 12 to make contact with the module substrate disposed in the body 18.

The connector guide 17 protects the connector pins 16 from an external impact and has a closed curve surrounding the connector pins 16 to guide the contact position with respect to the sensor unit 50.

The connector guide 17 is coupled to the sensor unit in a plug-in type.

The connector guide 17 may be formed of an insulating material or a metallic material on which resin is coated.

The connector pins 16 may include six pins 16 disposed in the arrangement of 2*3.

The connector pins 16 may include two pins for the sensor output signal, two pins for power, one pin for ground and one extra pin. The utilization of the connector pins 15 may be changed according to an embodiment and will be described in more detail below.

A height of the connector guide 17 may be equal to or greater than that of the pins 16 so that the connector pins 16 may be prevented from protruding out of the connector guide 17.

Referring to FIG. 9, the sensor unit 50 is inserted into the body 18 of the module unit 10.

The sensor unit 50 has the same shape as that of the cavity 12 regardless of a type of sensor formed in the sensor unit 50. The sensor unit 50 has an area equal to or larger than that of the cavity 12 such that the sensor unit 50 may be received in the cavity 12.

A groove is formed in the rear surface of the sensor unit 50 such that the connector of the module unit 10 is inserted into the groove. The module unit 10 may be connected to the amplifier unit 51 of the sensor unit 50 or the converting unit 54.

Figure 10:
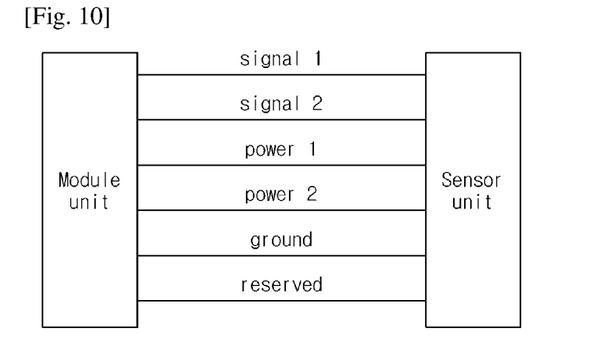
FIG. 10 is a signaling chart illustrating the function of the connector pins according to the first embodiment.
Figure 11:
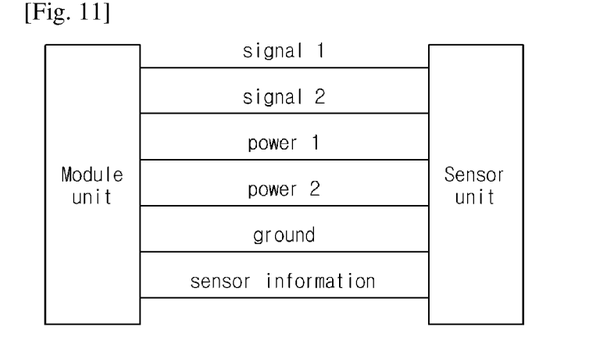
FIG. 11 is a signaling chart illustrating the function of the connector pins according to the second embodiment.

FIG. 10 is a signaling chart illustrating the function of the connector pins according to the first embodiment. FIG. 11 is a signaling chart illustrating the function of the connector pins according to the second embodiment.

Referring to FIG. 10, the connector pins 16 may include six pins.

Among the six pins 16, two pins are assigned for signal transmissions (signal 1 and signal 2), two pins are assigned for power supplies (power 1 and power 2), one pin is assigned for ground, and the remaining one pin is reserved.

As described above, the transmission and reception functions between the sensor unit 50 and the module 10 are performed through two pins for signals 1 and 2. Preferably, according to the first embodiment, analog signals are transmitted through the pins for signal 1 and signal 2.

FIG. 11 is almost similar to FIG. 10 except for the reserved pin.

Among the six pins constituting the connector pins 16 according to the second embodiment, two pins are assigned for signal transmissions (signal 1 and signal 2), two pins are assigned for power supplies (power 1 and power 2), one pin is assigned for ground, and the remaining one pin is assigned for the transmission of information about the kind of sensor.

Thus, the control unit 55 of the sensor unit 50 according to the second embodiment transmits the information about a kind of sensor stored therein to the module unit 10 through the assigned sensor information pin.

The module unit 10 receives the information transmitted through the sensor information pin and determines the kind of connected sensor unit 50 by using the information.

Figure 12A:
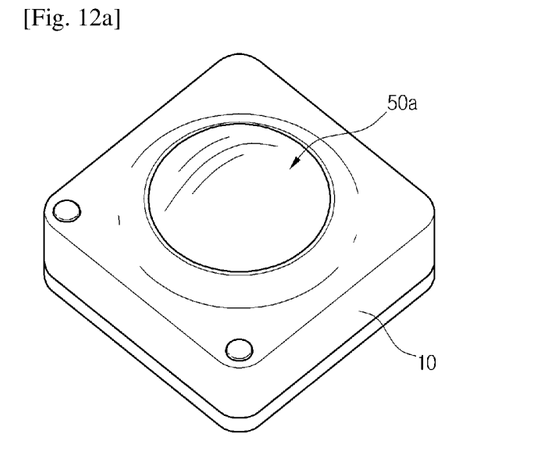
FIGS. 12a to 12c are perspective views showing various shapes of the sensor module 100 according to an embodiment.
Figure 12B:
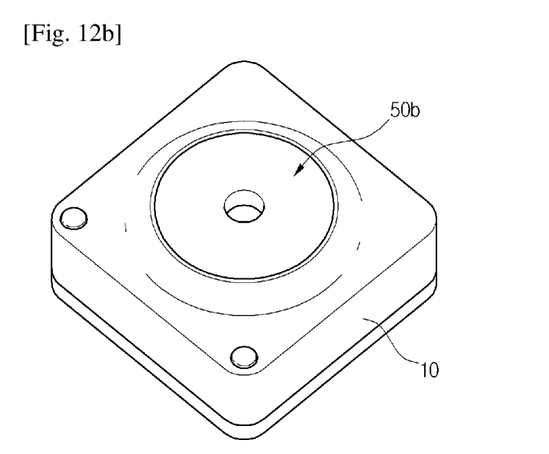
Figure 12C:
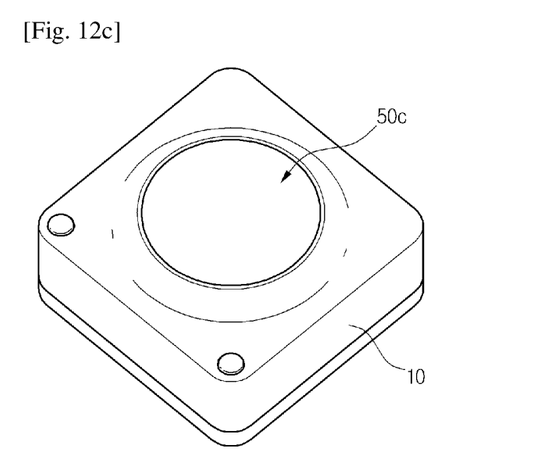

FIGS. 12*a* to 12*c* are perspective views showing various shapes of the sensor module 100 according to an embodiment.

As shown in FIGS. 12*a* to 12*c*, the sensor unit 50 may include various sensors.

For example, as shown in FIG. 12*a*, the sensor unit 50*a* may include a PIR (Pyroelectric Infrared Ray) sensor or an illumination sensor. A lens may be provided in the front portion of the sensor in order to satisfy an optical property of the sensor. The overall shape of the lens part corresponds to the cavity 12 of the module unit 10 and the lens part is inserted into the surface of the module unit 10 such that the lens is disposed on the surface of the module unit 10.

Meanwhile, as shown in FIG. 12*b*, the sensor unit 50*b* having the temperature sensor or the humidity sensor may be provided with a barrel formed between an outside and the sensor in order to detect external temperature or humidity. The overall shape of the sensor unit 50*b* corresponds to the cavity 12 of the module unit 10 and the sensor unit 50*b* is inserted into the surface of the module unit 10 such that the barrel is disposed on the surface of the module unit 10.

As shown in FIG. 12c, the sensor unit 50 having a microwave or electric field sensor has an even flat shape so that an additional supplementary shape is not required since the sensor unit 50 detects a variation of a radio wave or electric field in free space. The overall shape of the sensor unit 50c corresponds to the cavity 12 of the module unit 10 and the sensor unit 50c is inserted into the surface of the module unit 10 such that the sensor unit 50c is aligned with the surface of the module unit 10.

As described above, the sensor unit 50, in which various sensors are embedded, is designed to be inserted and fixed into the cavity 12 of the module unit 10, so that the sensor module 100 may be formed by coupling one module unit 10 to the various sensor units 50.

Figure 13:
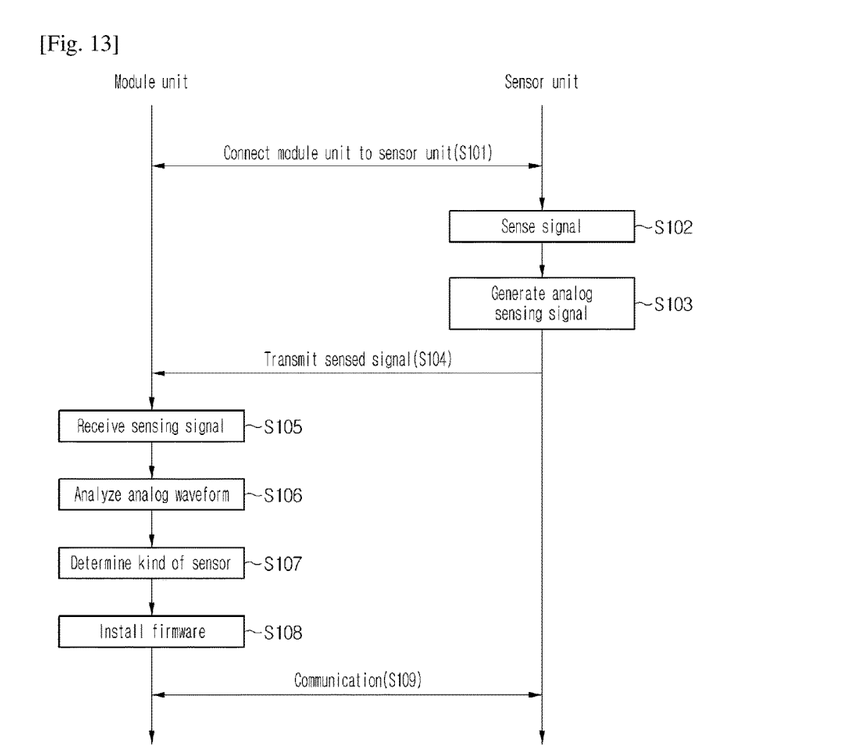
FIG. 13 is a signaling chart illustrating a method of operating a sensor module according to the first embodiment step by step.
Figure 14:
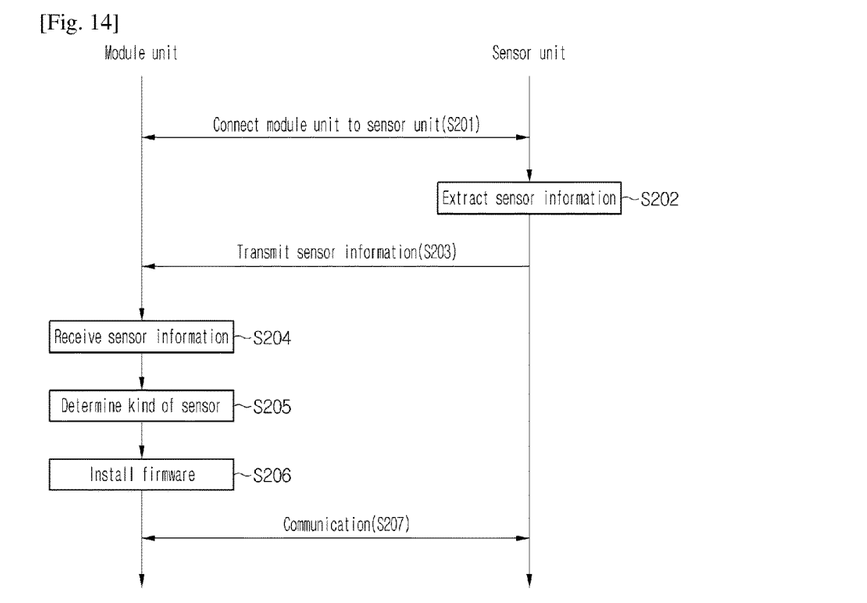
FIG. 14 is a signaling chart illustrating a method of operating a sensor module according to the second embodiment step by step.

FIG. 13 is a signaling chart illustrating a method of operating a sensor module according to the first embodiment step by step. FIG. 14 is a signaling chart illustrating a method of operating a sensor module according to the second embodiment step by step.

First, referring to FIG. 13, in step S101, as the sensor unit 50 is inserted into the connector 15 included in the module unit 10, the sensor unit 50 is connected to the module unit 10.

When the sensor unit 50 is connected to the module unit 10, the test period is elapsed. Thus, the sensor unit 50 and the module unit 10 are connected to each other.

To this end, the sensor unit 50 senses a signal according to current surrounding environment in step S102 and generates an analog sensing signal based on the sensed signal in step S103.

In step S104, when the sensor unit 50 generates the sensing signal, the sensor unit 50 transmits the analog sensing signal to the module unit 10.

The module unit 10 receives the analog sensing signal transmitted from the sensor unit 50 in step S105. The module unit 10 analyzes the waveform of the analog sensing signal in step S106 such that the module unit 10 identifies the kind of sensor constituting the sensor unit 50 in step S107.

After that, the module unit 10 analyzes the analog waveform of the received sensing signal in step S106. The analog waveforms have mutually different characteristics according to the kinds of the sensors 53 constituting the sensor unit 50. The module unit 10 has stored information about the characteristics of waveforms of analog sensing signals according to each sensor 53. The module unit 10 detects the kind of sensor 53 constituting the sensor unit 50 by using the stored characteristic information.

In step S108, when the kind of sensor 53 is identified, the module unit 10 extracts the firmware corresponding to the kind of identified sensor 53 and drives the extracted firmware.

In step S109, if the firmware driving process is completed, the connecting process between the module unit 10 and the sensor unit 50 is completed and then, a communication process of transmitting and receiving the sensing signal is performed.

Next, referring to FIG. 14, as the sensor unit 50 is inserted into the connector 15 provided to the module unit 10, the sensor unit 50 is connected to the module unit 10 in step S201.

If the sensor unit 50 is connected to the module unit 10, the test is performed for a predetermined time period. Thus, the condition setting process between the sensor unit 50 and the module 10 is performed.

To this end, the sensor unit 50 extracts the information according to the kind of sensor 53 stored therein in step S202 and transmits the extracted information to the module unit 10 in step S203.

In this case, the sensor unit 50 transfers the information to the module unit 10 through the sensor information pin of the connector pins 16 connected to the module unit 10.

In step S204, the module unit 10 receives the information about the kind of sensor through the sensor information pin.

If the module unit 10 receives the information, the module unit 10 determines the kind of sensor 53 constituting the connected sensor unit 50 by using the received information in step S205.

Then, when the kind of sensor 53 is determined, the module unit 10 extracts the firmware according to the determined kind and drives the extracted firmware in step S206.

According to the embodiment, a single device is designed to be commonly used for various sensors, so that the development cost and time can be reduced and product standardization is possible.

In addition, according to the embodiment, the kind of a sensor unit currently connected can be automatically determined and the functions of the sensor unit can be performed, so the driving conditions of the sensor unit can be automatically changed according to operating environment, thereby improving the product reliability and user satisfaction.

Although a preferred embodiment of the disclosure has been described for illustrative purposes, those skilled in the art will appreciate that various modifications, additions and substitutions are possible, without departing from the scope and spirit of the invention as disclosed in the accompanying claims.

The invention claimed is:

1. A sensor module comprising:
 a module body having a cavity and a module substrate provided in the module body; and
 a sensor body detachable from the cavity of the module body and a sensor provided in the sensor body,
 wherein the module body is configured to generate sensing information by reading an output signal of the sensor, and wirelessly outputting the sensing information, and
 wherein the sensor body has a shape and a same structure that corresponds to a shape of the cavity,
 wherein the shape and the structure of the second body are standardized regardless of a kind of the sensor,
 wherein the sensor body is inserted into the cavity of the module body to connect to the module substrate,
 wherein the module body further includes a connector that protrudes from a bottom of the cavity, and the sensor body is coupled to the module body when the sensor body is inserted into the connector, and
 wherein the connector includes:
 a connector guide having a closed curve from a bottom surface of the connector; and
 a plurality of connector pins provided in the connector guide.

2. The sensor module of claim 1, wherein the sensor includes at least one of a PIR (Pyroelectric Infrared Ray) sensor, an illumination sensor, a temperature sensor, a humidity sensor, a microwave sensor and an electric field sensor.

3. The sensor module of claim 1, wherein the sensor body includes:
the sensor;
a filter to filter a sensing signal of the sensor; and
an amplifier to amplify an output of the filter and to output an analog sensing signal to the module body.

4. The sensor module of claim 3, wherein the module substrate includes:
a module controller to analyze an analog waveform of the analog sensing signal output through the module body in order to determine a kind of the sensor included in the sensor body and to generate the sensing information corresponding to a determination result according to the sensing signal; and
a wireless communicator to convert the sensing information generated through the module controller into a wireless signal in order to output the wireless signal.

5. The sensor module of claim 4, wherein the module controller stores a plurality of firmware therein and executes a firmware corresponding to the determined kind of the sensor when the kind of the sensor is determined.

6. The sensor module of claim 1, wherein the connector pins include:
a first pin to transceive the sensing signal of the sensor;
a second pin to supply electric power;
a third pin for grounding; and
a fourth pin to transceive information about a kind of the sensor.

7. The sensor module of claim 6, wherein the sensor body includes:
the sensor;
a filter to filter a sensing signal of the sensor;
a converter to convert a signal of the filter into a digital signal to output the digital signal to the module body; and
a sensor controller to output the information about the kind of the sensor to the module body through the fourth pin when the sensor body is connected to the connector.

8. The sensor module of claim 7, wherein the module substrate includes:
a module controller to read the digital signal output through the sensor in order to generate the sensing information and to output the sensing information; and
a wireless communicator to convert the sensing information generated through the module controller into a wireless signal in order to output the wireless signal, and
wherein the module controller determines a kind of the sensor by using information about the kind of the sensor output through the sensor body and to execute a firmware according to the determined kind of the sensor.

* * * * *